United States Patent Office 3,058,489
Patented Oct. 16, 1962

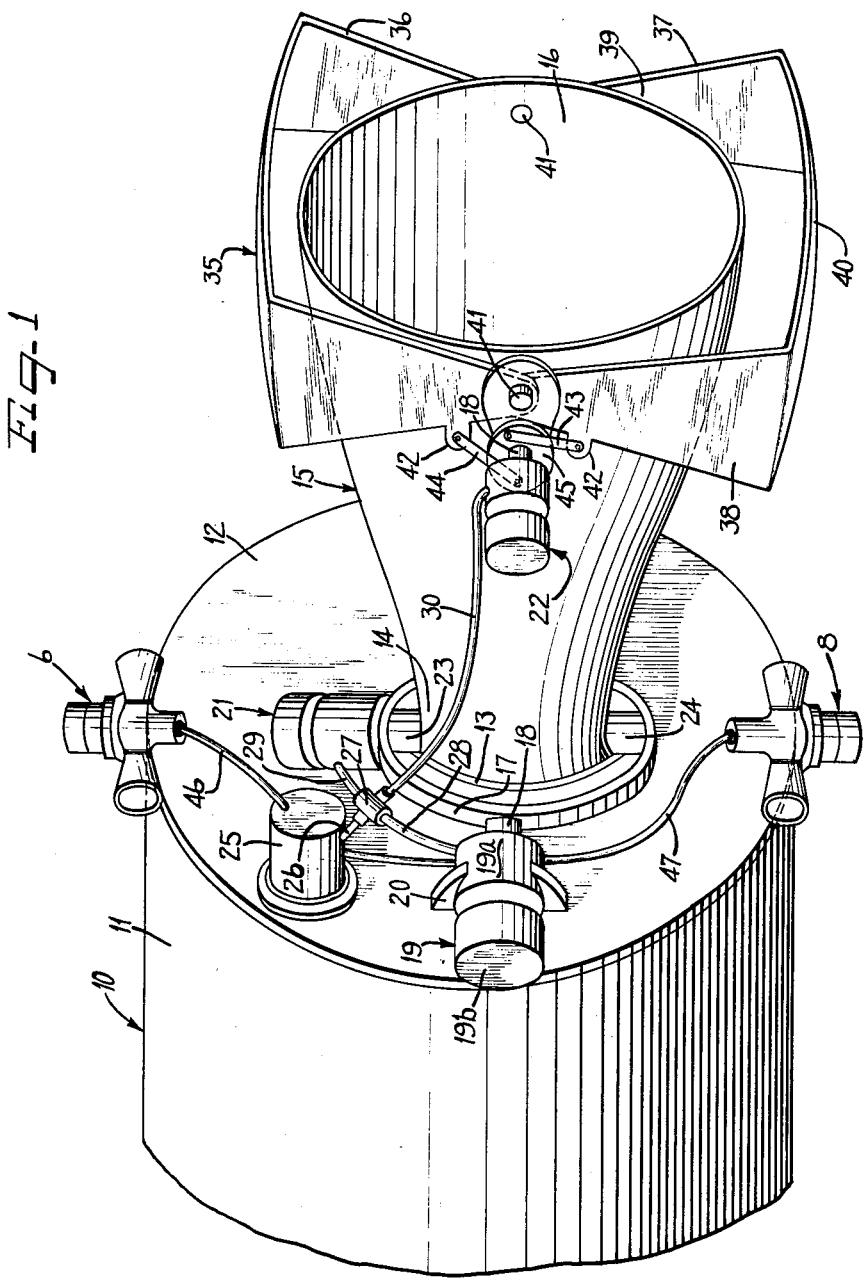

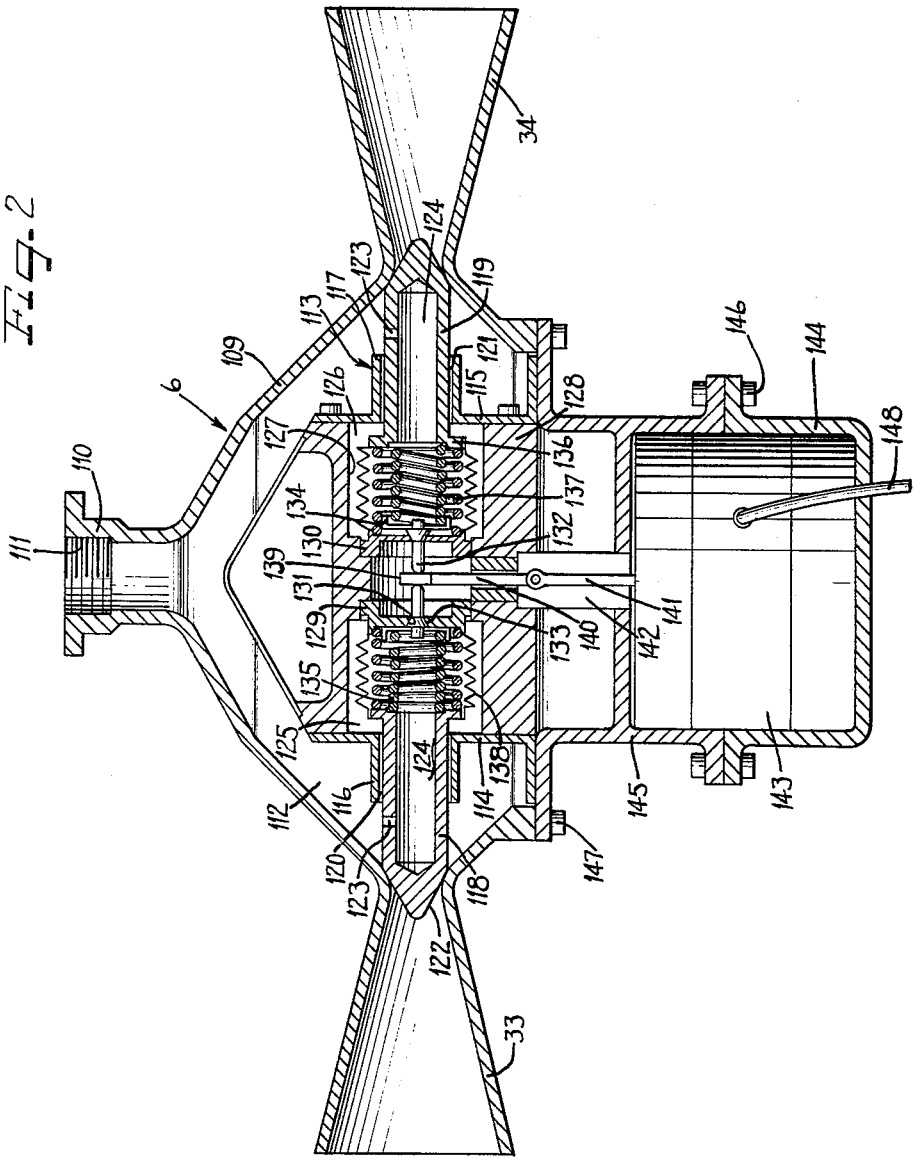

3,058,489
CONTROL FOR ROCKET ENGINES
Marshall James Corbett, Cleveland, Ohio, assignor to Thompson Ramo Wooldridge Inc., Cleveland, Ohio, a corporation of Ohio
Filed Mar. 2, 1959, Ser. No. 796,556
3 Claims. (Cl. 137—627.5)

The present invention relates broadly to rocket engines, and is more particularly concerned with new and improved nozzle means structure especially suitable for reliably controlling roll movement of rocket engines and related vehicles.

It is an important aim of the present invention to provide a rocket roll control nozzle, featuring therein exhaust gas discharge passages selectively opened and closed by valve means defining external and internal gas flow passages and movable to an open position when the pressures exerted thereagainst are relatively greater in the external passages than in said internal passages.

Another object of this invention lies in the provision of roll control jets having nozzle portions controllably opened and closed by leakdown valves regulated by lever means under action of a torque motor, the lever means opening one of the valves and providing a relatively low pressure flow path therethrough whereby the valve is moved by relatively greater pressure applied externally thereof to open one of the nozzles and provide the necessary thrust to rotate the rocket.

Still another object of this invention is to provide a nozzle structure for effecting roll control of rockets and the like, comprising a housing defining a chamber and an inlet opening thereto and at least one exhaust opening therefrom, a valve assembly in said chamber having a valve member normally urged to a position closing said exhaust opening and provided with a flow passage in communication with the chamber inlet opening, the valve assembly defining a compartment having an aperture communicating with the valve member flow passage and closed when the valve member is in a position closing the exhaust passage from the chamber, and actuating means connecting with the nozzle housing and opening the aperture to the compartment providing gas flow from the inlet passage through the valve member and essentially simultaneously therewith moving the valve member away from closing relation with the exhaust passage to port gas therethrough from the inlet passage.

A further object of the present invention lies in the provision of a pair of diametrally opposed roll control nozzles adapted for mounting on the hot side of a rocket engine and receiving gas from generating means housing a nitrate base solid propellant and ignitable independently of the main propellant charge for the rocket.

Other objects and advantages of the present invention will become more apparent during the course of the following description, particularly when taken in connection with the accompanying drawings.

In the drawings, wherein like numerals are employed to designate like parts throughout the same:

FIGURE 1 is a side elevational view of one end of a rocket engine embodying roll control nozzles constructed in accordance with the principles of this invention; and FIGURE 2 is a sectional view through one of the roll control nozzles and showing in detail the structural features thereof.

Briefly stated, the present invention is directed to a nozzle construction especially applicable in accurate and reliable roll control in rocket engines. The nozzles are mounted at diametrally opposed locations with respect to the end wall of the rocket engine housing defining the hot end thereof. The nozzles are supplied by gas from a generator which may also serve actuator means effecting tilting of a single main thrust nozzle to control pitch and yaw.

Each roll control nozzle preferably comprises a housing shaped with an inlet passage connecting with the gas generator and a pair of oppositely facing nozzle portions. Interiorly of the housing is a valve assembly having a stepped bore defining a pair of compartments receiving in each a plate member having a central opening normally closed by pin means or the like. The valve assembly is further formed with a collar portion at opposite ends, and slidable therein is a valve member coaxially spaced therefrom. The valve members each have an end shaped to close the interior of the nozzle portions, and at their opposite ends the valve members connect with resilient bellows means joined to the plate members. Each valve member is apertured adjacent the shaped end and is hollow so that a flow passage is provided by the valve member and bellows means and extending from the valve member aperture to the opening in the plate member. A lever connects with a torque motor, which is preferably in the nozzle housing, and an electrical signal from the rocket autopilot system to the torque motor tilts the lever to release the pin from the opening in one of the plate members. This provides a relatively low pressure flow path through the valve member, and relatively greater pressures through the coaxial space surrounding the valve member move the same to open one nozzle portion to the discharge of gases. A follow-up spring is provided to return the pin means to position, and other structural features of the present invention will become apparent during the course of the description now to follow.

A particularly suitable environment for the roll control nozzles of this invention is in association with a single main thrust nozzle tiltable by actuator means for accomplishment of pitch and yaw control in essentially the structural arrangement shown in FIGURE 1. It will of course be appreciated that the roll control nozzles need not be employed in this particular association, and find diverse uses in other rocket engine systems and in airborne vehicles of other types requiring accurate and reliable control of roll movements.

A rocket engine the roll of which may be controlled by a pair of identical nozzles 6 and 8 is designated generally in FIGURE 1 by the numeral 10, and is provided with a generally cylindrical housing 11 defining interiorly a combustion chamber and mounting an end wall 12 at the exhaust end or hot side of the engine 10. The end wall is provided with an opening generally centrally thereof, as indicated by the numeral 13, to receive therein for tiltable movement neck portion 14 of a single main thrust nozzle 15, which may be of the general frusto-conical shape shown and extending axially outwardly from the engine housing 11. Exhaust gases are discharged from the nozzle 15 through a relatively wide mouth or discharge portion 16.

For pitch and yaw control purposes, the nozzle 15 tilts through an angle of about plus 5° and minus 5° with respect to the longitudinal axis of the housing 11 and with respect to a transverse axis intersecting the housing longitudinal axis. In the position of the rocket engine 10 shown in FIGURE 1, the longitudinal axis is also the horizontal axis, and the transverse axis is the vertical axis, and will be designated as such during the following description. The neck portion 14 of the nozzle 15 is supported by the end wall portions surrounding the opening 13, and circumferentially spaced in surrounding relation to the neck portion 14 is a gimbal ring 17. To effect tiltable movement of the nozzle 15 about a horizontal axis for pitch control, the gimbal ring 17 connects with shaft means 18 rotated by actuator means 19 attached by flange means 20 to the housing end wall 12.

The actuator means 19 and companion units 21 and 22, employed for yaw control and operation of thrust reversal means when utilized, may take various forms and the structural details thereof form no part of the present application. However, the actuator means 19, 21 and 22 may embody a rotary gas actuator portion 19a supporting axially thereof the shaft 18 caused to rotate when torque motor portion 19b receives an electrical signal from the rocket autopilot system, creating a pressure unbalance in the actuator portion 19a.

As stated, the actuator means 21 serves the yaw control function, and for this purpose is supported by the gimbal ring 17 at a location circumferentially spaced about 90° from the shaft connection 18 of the actuator 19 with the gimbal ring 17. The actuator 21 is provided with a shaft (not shown) of the same character as the shaft 18 of the actuator means 19, and said actuator shaft connects with a stub shaft 23 rigid with the nozzle neck portion 14 and rotatable with respect to the gimbal means 17. At a diametrally opposed location on the nozzle neck portion 14, and essentially in alignment with the vertical or transverse axis of the rocket engine housing 11, there is provided a second stub shaft 24 which rotates upon the inner diameter of the gimbal ring 17 and is suitably secured to the nozzle neck portion 14. If desired, the stub shaft 23 may be replaced by the rotatable shaft of the actuator means 21.

To drive the actuators 19 and 21 for pitch and yaw control purposes, to operate the actuator means 22 for thrust reversal purposes, and to provide thrust for the roll control nozzles 6 and 8, the rocket engine 10 mounts gas generator means 25, which may be in the form of a tank or container supported by the end wall 12 of the housing 11. The gas generator houses a propellant which preferably is of the solid type, and experience to date indicates that a nitroguanadine triple base composition is highly desirable.

The use of a gas generator 25 solely for the purpose of driving the three actuator means 19, 21 and 22, and to provide a gas supply to the roll control nozzles 6 and 8, is considered to have important advantages over the use of the main propellant charge for these purposes. First, the gas servo or actuator pressures can be a factor of three higher than the usually available rocket combustion chamber pressure, which is generally of the order of about 500 p.s.i.a. This means that the system's stiffness is equally better, and the gas actuator is about one-third the size and weight. Accordingly, a net weight saving is effected when a relatively small separate high pressure gas generator 25 is employed. Second, the actuators herein employed have relatively small internal flow passages, necessitating absolute cleanliness of the gases used to operate the actuators. Gases from the main propellant charge frequently contain either solid or liquid oxides, and these could well have a deleterious effect upon the actuator operation. Third, the temperature of the gases from a separate gas generator 25 may be about 4000° F. cooler than the main propellant gases. While diluents could of course be added to the main propellant gases, the weight and complexity of diluent systems is substantially greater than a relatively cool (1200° F.) burning gas generator 25.

The propellant contained in the gas generator 25 may be ignited in any suitable manner, and ignition means of the squib type may be employed for this purpose. To direct the gases from the generator 25 to the actuators 19, 21 and 22, a main conduit or connection 26 is provided leading to a four-way connecting member 27 from which branch connections 28, 29 and 30 are taken to the actuator means 19, 21 and 22, respectively.

If desired, the rocket engine 10 of FIGURE 1 may embody therein thrust reversal means generally indicated by the numeral 35 and mounted by the single main thrust nozzle 15 along the longitudinal axis thereof and inwardly of the mouth portion 16. Such means may comprise a pair of clamshell members 36 and 37, each being provided with a pair of spaced generally flat side wall portions 38 and 39 connected by a curved arcuate end portion 40. The side portions 38 and 39 of each clamshell member 36 and 37 are apertured adjacent their inner ends for receival upon pin means 41, and outwardly of the pin means each side portion 38 is formed with ear 42, and to said ears there are connected link arms 43 and 44 pinned or otherwise secured to a circular disc 45. The disc member 45 receives the shaft 18 of the actuator 22 for rotation when an electrical signal is received by the actuator means 22 from the autopilot system. A pressure unbalance is thereby created within the actuator portion 23, in the manner earlier described with reference to the actuator means 19. Rotation of the actuator shaft 18 causes corresponding rotation of the disc member 45 to move the clamshell members 36 and 37 into an open or closed position. Specifically, clockwise rotation of the shaft 18 and disc member 45 translates the link arms 43 and 44 to move the clamshell members 36 and 37 rearwardly to a closed or partially closed position, at which time the link arms 43 and 44 are extended essentially rearwardly. If required, the thrust reversal means 35 may employ in association therewith suitable stop means in the form of abutment blocks or the like, which may be attached to the thrust nozzle to limit the extent of opening movement of the clamshell members 36 and 37.

The present application is more specifically directed to the provision of a pair of roll control nozzles 6 and 8 arranged in diametrally opposed location with respect to one another in the manner of FIGURE 1, and embodying the structural features illustrated in FIGURE 2. It is to be seen from FIGURE 1 that the nozzles 6 and 8 are essentially in alignment with the stub shafts 23 and 24, and that the nozzle 6 is supplied with gas from the generator means 25 through conduit means 46, while nozzle 8 communicates with the gas generator 25 through conduit means 47. The roll control nozzles 6 and 8 are preferably identical in construction, and accordingly, the description now to follow will be directed to the nozzle 6.

Referring now specifically to FIGURE 2, the nozzle means 6 comprises a housing 109 shaped to provide a pair of outwardly extending, oppositely facing and generally conical nozzle members 33 and 34 and an inlet neck or mouth portion 110 defining a gas inlet passage 111 communicating with conduit means 46 leading to the gas generator 25. The housing 109 defines interiorly thereof a chamber 112, and mounted within said chamber is a valve assembly 113.

The valve assembly generally designated as 113 comprises a pair of spaced end wall members 114 and 115 provided with axially extended annular collar portions 116 and 117 coaxially spaced from a pair of axially movable valve members 118 and 119 to provide therebetween an annular gas flow passage 120 and 121 in communication with the chamber 112 and inlet passage 111 thereto. The valve members 118 and 119 are seen to be generally cylindrical in shape and provided with a conical end portion 122 for sealing contact with the inner walls of the housing 109 to open and close the passage between the chamber 112 and the discharge nozzles 33 and 34. Each valve member 118 and 119 is apertured at 123 to provide communication between the chamber 112 and bore 124 of each valve member.

The annular passages 120 and 121 between the valve members and annular collar portions 116 and 117 communicate with a pair of chambers 125 and 126 defined by a stepped bore 127 in valve assembly body member 128 suitably attached to the end wall members 114 and 115. Seated within the bore 127 is a pair of spaced plate members 129 and 130 each provided with a countersunk opening 131 receiving pin means 132 having a frusto-conical portion 133 formed thereon bearing against a centrally apertured disc member 134 bottoming one end of spring means 135 which bottoms at its opposite end against a shoulder 136 formed on the base of each valve member 118 and 119. The shoulder 136 further bottoms spring means 137 provided interiorly of bellows means 138 attached at opposite ends to the shoulder 136 and to the plate member 129. The bellows spring 137 bottoms at its opposite end against the plate member 129 or 130.

The pin means 132 are caused to travel axially one at a time by provision of a camming surface 139 on a lever member 140 tiltable by a connecting member 141 extending axially within a shaft 142 of a torque motor 143. The torque motor 143 is housed within body portions 144 and 145 connected by bolt means or the like 146, the annular body portion 145 being secured to the nozzle main body portion 109 by screws or the like 147. The torque motor 143 is caused to rotate by an electrical signal from the rocket autopilot system, and an electrical connection 148 thereto is provided for this purpose. The torque motor 143 may take various forms, and for example, may be a reversable electric motor of the two phase induction type having a squirrel cage armature rotatable within a stator having windings thereon.

Upon ignition of the propellant contained in the generator 25 of FIGURE 1, hot gas continuously flows through the conduit means 46 to the inlet passage 111 of the roll control nozzle 6, and similarly, through the conduit 47 to the corresponding inlet passage of the roll control nozzle 8. This hot gas flows both through the aperture 123 in each valve member 118 and 119 and also through the annular passages 120 and 121 surrounding said valve members 118 and 119. The gas pressures exert an axial force against the valve members interiorly thereof within the bore 124 in each, and said pressures are aided by the bellows spring means 137 to maintain the valve members 118 and 119 in their closed positions of FIGURE 2. However, when an electrical signal is received by the torque motor 143 through the connection 148 to the rocket autopilot system the lever arm 140 is tilted and by action of the raised cam surfaces 139 thereon, one of the pin means 132 is caused to move axially opening the aperture 131 in one of the plate members 129 or 130 porting to the chamber between said plate members gas pressures within the valve member bore 24. Gas pressures travelling through the annular passage 120 or 121 surrounding either of the valve members 118 or 119 thereupon exert a sufficient action upon the outer face of the shoulder 136 on either of the valve members, to cause axial movement of the conical end portion 122 of either valve member to open the passage from the chamber 112 to either of the nozzles 6 or 8. Ultimately pressure again builds up within the valve member bore 124, and together with the force of the bellows spring means 137, the valve member 118 or 119 is caused to close. During this action, however, the followup spring 135 acts to return the pin means 132 to an aperture closing position. It is of course appreciated that only one of the nozzle members 6 or 8 ports exhaust gases at a particular moment, and the torque motors 143 of the roll control nozzles 6 and 8 are reversed so that thrust is provided in the same direction to rotate the rocket. As for example, to roll the rocket in a clockwise direction, the nozzle member 34 of each roll control nozzle 6 and 8 exhausts hot gases in the manner described in connection with FIGURE 2.

The instant application is related to my copending applications Serial Nos. 796,311 directed particularly to the general combination of FIGURE 1, and 796,557, more especially directed to the structural features of the actuator means 19, 21 and 22 of FIGURE 1.

It is to be seen from the foregoing that applicant has provided a novel combination of roll control nozzles with a single main thrust nozzle tiltable by gimbal means and actuating means to effect pitch and yaw control, the roll control nozzles being located at opposed locations and constructed essentially as shown in FIGURE 2 to reliably and accurately impart rotational twist to an airborne vehicle such as a rocket engine in the manner herein described. The roll control nozzles embody a minimum number of readily fabricated, assembled and disassembled parts, and as is readily apparent, numerous variations and modifications may be effected in the arrangement shown in the drawings and described herein without departing from the novel concepts of the present invention.

I claim as my invention:

1. A valve assembly comprising a body portion formed at each of the opposite ends thereof with collar portions and having a bore terminating at opposite ends in said collar portions, a pair of spaced centrally apertured plate members disposed in an upright position in said bore and with opposite ends of said body portion defining a pair of spaced vent compartments, a hollow valve member axially slidable within each collar portion and coaxially spaced therefrom to define with each of said collar portions an annular passage providing a fluid flow path from an inlet to a vent compartment, expansible means within each of said vent compartments connected to each valve member and to an adjacent plate member and closing one end of each valve member, resilient means bottomed at opposite ends against each plate member and said one end of each valve member for urging the opposite end of each valve member into closing relation with a fluid outlet, spring pressed means normally closing the aperture in each plate member, each of said valve members adjacent said opposite end thereof being provided with a restricted opening communicating said inlet with the interior of each valve member, and actuating means for urging said spring pressed means out of closing relation with the aperture in one of said plate members to bleed off fluid from the interior of one valve member, whereupon a pressure differential is created between the valve interior and vent compartment and the fluid in said compartment acts against said one end of a valve member to move the opposite ends thereof away from closing relation with respect to said fluid outlet.

2. A valve assembly for a thrust nozzle provided with a housing defining a chamber having inlet and exhaust openings communicating therewith, comprising a valve body portion fixedly secured within said chamber, said body portion at each of the opposite ends thereof being formed with collar portions and having a bore terminating at opposite ends in said collar portions, a pair of spaced centrally apertured plate members disposed in an upright position in said bore and with opposite ends of said body portion defining a pair of spaced vent compartments, a hollow valve member axially slidable within each collar portion and coaxially spaced therefrom to define with each of said collar portions an annular passage providing a fluid flow path from said housing inlet opening to a vent compartment, expansible means within each of said vent compartments connected to each valve member and to an adjacent plate member and closing one end of each valve member, resilient means bottomed at opposite ends against each plate member and said one end of each valve member for urging the opposite end of each valve member into closing relation with a housing exhaust passage, spring pressed means normally closing the aperture in each plate member, each of said valve members adjacent said opposite end thereof being provided with a restricted opening communicating said housing inlet passage with the interior of each valve member, and actuating means for urging said spring pressed means out of closing relation with the aperture in one of said plate members to bleed off fluid from the interior of one valve member whereupon a pressure differential is created between the valve interior and vent compartment and the fluid in said compartment acts against said one end of a valve member to move the opposite end thereof away from closing relation with respect to a housing exhaust passage.

3. A valve assembly for a thrust nozzle provided with a housing defining a chamber having inlet and exhaust openings communicating therewith, comprising a valve body portion within said chamber and attached to said housing, said body portion being formed at opposite ends with an annular collar portion and having a central bore extending therethrough, a pair of spaced centrally apertured plate members secured within said bore and cooperating with opposite ends of said body portion to define therewithin a pair of vent compartments, a tubular valve member slidable within each collar portion and coaxially spaced therefrom to define with each of said collars an annular fluid flow passage communicating said housing inlet with a vent compartment, diaphragm means connected to one end of each of said valve members and to each of said plate members to enclose said one end of each of said valve members, first spring means within said diaphragm means resiliently urging each of said valve members into closing relation with said housing exhaust openings, pin means received in said central aperture in each of said plate members, second spring means within said first spring means resiliently maintaining said pin means in each of said apertures, each of said valve members intermediate the opposite ends thereof being provided with a restricted aperture communicating said housing inlet passage with the interior of each valve member, and actuating means for urging one of said pin means in opening relation to the central aperture in one of said plate members to bleed off fluid from the interior of one valve member through said apertures, whereupon the pressure of the fluid entering through said annular flow passage acts against said one end of one valve member to withdraw the same from closing relation with respect to a housing exhaust passage.

References Cited in the file of this patent
UNITED STATES PATENTS

| | | |
|---|---|---|
| 1,176,535 | Fulton | Mar. 21, 1916 |
| 1,326,247 | Zengel | Dec. 30, 1919 |
| 2,075,600 | Baker | Mar. 30, 1937 |
| 2,463,921 | Titcomb | Mar. 8, 1949 |
| 2,553,940 | Quartullo | May 22, 1951 |
| 2,764,868 | Watson et al. | Oct. 2, 1956 |
| 2,868,478 | McCloughy | Jan. 13, 1959 |
| 2,929,252 | Evers et al. | Mar. 22, 1960 |

FOREIGN PATENTS

| | | |
|---|---|---|
| 879,835 | France | Dec. 10, 1942 |
| 610,143 | Great Britain | Oct. 12, 1948 |